June 26, 1928.
P. J. SHRUM
1,675,142
THREAD PROTECTOR
Filed April 22, 1924
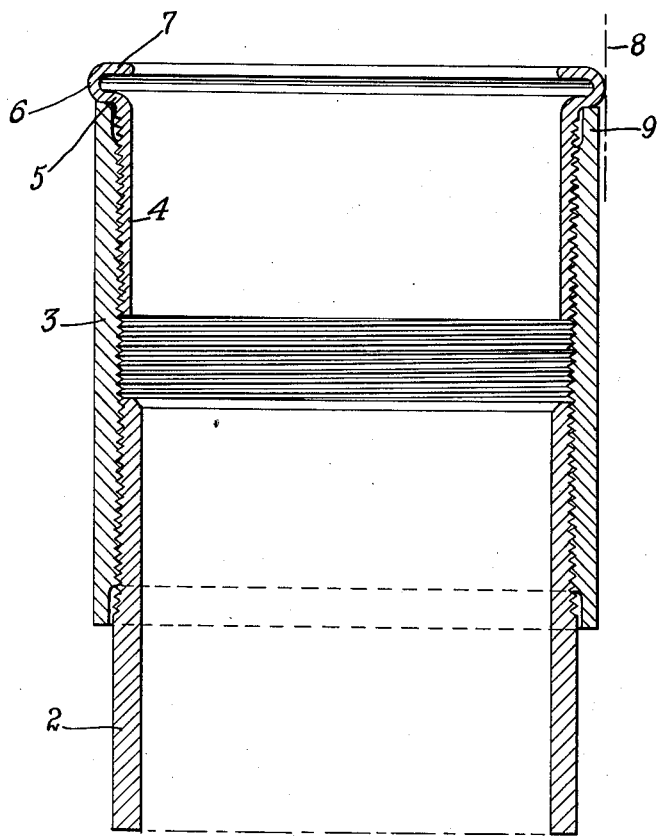
INVENTOR.
Peter J. Shrum
BY Greenly McCallister
His ATTORNEYS.

Patented June 26, 1928.

1,675,142

UNITED STATES PATENT OFFICE.

PETER J. SHRUM, OF MONACA, PENNSYLVANIA, ASSIGNOR TO COLONA MANUFACTURING COMPANY, OF PITTSBURGH, PENNSYLVANIA, A CORPORATION OF PENNSYLVANIA.

THREAD PROTECTOR.

Application filed April 22, 1924. Serial No. 708,204.

The present invention relates broadly to thread protectors, and more particularly to thread protectors for pipe couplings and internally threaded pipe.

It is customary in shipping externally threaded pipe for use in oil wells, for example, to protect the unthreaded ends of the pipe from injury during handling of the pipe in loading them onto and unloading them from the cars, and during the transportation, by screwing a thread protector onto one end of each pipe and a pipe coupling onto the other end thereof. This method of protecting the threaded ends of the pipe, however, leaves one end portion of each pipe coupling unprotected so that such end portion is liable to be deformed or have its threads mutilated, due to the pipe striking against each other in being loaded or unloaded or to the rolling of the pipe against each other during transportation. The end portions of internally threaded pipe are likewise liable to injury during handling and transportation.

In the case of either the pipe coupling or the internally threaded pipe, the most vulnerable portion thereof is the extreme end portion of the coupling or pipe, because a blow which would do no damage if received on a portion of the coupling or pipe removed a substantial distance from the extreme end portion thereof is liable to be injurious if received on the extreme end portion.

The purpose of the present invention is to provide a thread protector for use with pipe couplings and internally threaded pipe, which is so constructed as to offer special protection to the extreme end portion of the coupling or pipe with which it may be associated.

The figure is a sectional view showing a thread protector embodying my invention associated with a pipe coupling which is screwed onto the end of a pipe.

In the construction shown, 2 represents the end portion of a pipe, and 3 a pipe coupling of usual construction mounted thereon. The thread protector has an annular externally threaded body portion 4 formed at one end with an outwardly extending rib adapted to engage the end of the coupling and being substantially U-shaped in cross section providing, in effect, a double-walled flange composed of the outwardly extending flange 5 and the inwardly extending lip 7 connected by the annular wall 6.

It will be noted that the annular wall 6 is curved outwardly in cross section and that a line 8, drawn tangent to the outer surface of the wall and parallel to the axis of the pipe coupling, is spaced a slight distance from the outer surface of the latter.

When piling pipe equipped at one end with couplings, as when loading them onto a car, the extreme end portion of a coupling is apt to strike against or be struck by another pipe and thereby be deformed to such an extent that the coupling can not be screwed onto the end of another pipe. It is customary to leave the extreme end portions of a coupling unthreaded, as indicated by the reference numeral 9, in order that the threads of the coupling may be less liable to injury during handling of the coupling. Consequently, when the thread protector is screwed into the coupling, the inner surface of the extreme end portion of the coupling is spaced a slight distance from the outer surface of the body portion of the protector, so that the latter offers little protection against the extreme end portion of the coupling being deformed when struck a sufficiently hard blow.

By having the annular wall 6 extend outwardly slightly beyond the outer surface of the coupling, the extreme end portion of the coupling is protected against being injured by striking against or being struck by another pipe or other object. On the other hand, this wall does not extend far enough beyond the outer surface of the coupling to interfere to any appreciable extent with the pipe being piled compactly. The double-walled flange at the end of the thread protector serves to reinforce and stiffen the portion of the protector which is most liable to be deformed or otherwise injured. The inwardly extending lip 7 is also adapted to cushion any blows which it may receive by reason of the fact that it is more or less resilient, due to its being spaced from the flange 5 and supported at its outer edge only. The double-walled flange can be formed by bending the end portion of the protector outwardly to form the flange 5, then upwardly to form the annular wall 6 and then inwardly to form the lip 7.

While I have shown and described a certain embodiment of my invention, it will be understood that the invention is not limited to this precise embodiment, as it may be otherwise embodied without departing from the spirit of the invention or scope of the appended claims.

I claim:

1. A one piece thread protector so formed from a section of tubing as to provide a body open at both ends, the exterior of the said body being tapered and threaded, the outer end of the body terminating in an outwardly projecting annular flange having an inwardly projecting annular lip spaced therefrom and overlying the same, the internal diameter of the edges of the said lip being substantially the same as the internal diameter of the body.

2. A one piece thread protector so formed from a section of tubing as to provide a body open at both ends, one of the said ends terminating in an outwardly projecting annular flange having an inwardly projecting annular lip spaced therefrom and entirely overlying the same, the exterior of the said body being tapered and threaded substantially the entire length of the body.

3. A one piece thread protector so formed from a section of tubing as to provide a body open at both ends, one of the said ends terminating in an outwardly projecting annular flange having an inwardly projecting annular lip spaced therefrom and entirely overlying the same, the exterior of the said body being tapered its entire length and threaded adjacent the said annular flange.

In testimony whereof I have hereunto set my hand.

PETER J. SHRUM.